(12) United States Patent
Proctor et al.

(10) Patent No.: US 8,610,901 B2
(45) Date of Patent: Dec. 17, 2013

(54) METHOD AND APPARATUS FOR DETERMINING FLATNESS CHARACTERISTIC FOR REFLECTIVE FACET OF POLYGON ASSEMBLY

(75) Inventors: Douglas E. Proctor, Rochester, NY (US); Robert Paul Herloski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 140 days.

(21) Appl. No.: 13/216,335

(22) Filed: Aug. 24, 2011

(65) Prior Publication Data

US 2013/0050699 A1 Feb. 28, 2013

(51) Int. Cl.
*G01B 11/30* (2006.01)

(52) U.S. Cl.
USPC .......................................... 356/600; 356/608

(58) Field of Classification Search
USPC ............................. 356/600–613, 237.1–237.6;
250/559.01, 559.19, 559.22
See application file for complete search history.

(56) References Cited

U.S. PATENT DOCUMENTS 5,004,348 A * 4/1991 Magome ........................ 356/401
7,525,668 B2 * 4/2009 Ono ............................. 356/601

OTHER PUBLICATIONS

D. Kessler et al., Dynamic optical tests of a high-speed polygon, Applied Optics, vol. 20, No. 6, Mar. 15, 1981, pp. 1015-1019.

\* cited by examiner

*Primary Examiner* — Tri T Ton
(74) *Attorney, Agent, or Firm* — Fay Sharpe LLP

(57) ABSTRACT

A method for determining a flatness characteristic for a facet of a polygon assembly includes a) rotating a polygon assembly with facets at a desired speed, b) directing a light beam from a light source toward the polygon assembly so light is reflected by consecutive facets during revolutions of the polygon assembly, reflected light passing through a focusing lens that directs a spot light toward a target with spaced-apart bars arranged in a grating pattern that block a portion of the reflected light and allows another portion to pass through another focusing lens that directs another spot light toward a light sensor, the light sensor detecting intensity of the spot light, and c) measuring the intensity over time during revolutions of the polygon assembly to obtain measurements for each facet. An associated test setup includes a fixture, motor controller, light source, light sensor, two focusing lens, target, and system controller.

20 Claims, 12 Drawing Sheets

METHOD AND APPARATUS FOR DETERMINING FLATNESS CHARACTERISTIC FOR REFLECTIVE FACET OF POLYGON ASSEMBLY

BACKGROUND

The present exemplary embodiment relates generally to determining a flatness characteristic for a reflective facet of a polygon assembly. It finds particular application in a dynamic test setup suitable for testing a polygon assembly or a motorized polygon assembly (MPA) at a normal operating speed that the assembly under test is expected to experience during operation of system equipment with a raster output scanning (ROS) subsystem that includes the assembly under test. The dynamic test can determine the curvature of any individual reflective facet for the assembly under test. The deviation of facet-to-facet flatness for the assembly under test can also be determined. The facet curvature and facet-to-facet deviation can be compared to predetermined thresholds to determine if the assembly under test is suitable (or not suitable) for use in a ROS subsystem. However, it is to be appreciated that the exemplary embodiments described herein are also amenable to testing polygon assemblies or motorized polygon assemblies for other purposes. For example, the dynamic test may be used to test capabilities of experimental designs, to prove principles of new designs, to accept tooling for manufacturing runs, to confirm assemblies are suitable for sale by a manufacture or supplier, or to accept procurement of assemblies from a manufacture or supplier.

Facet-to-facet flatness of a polygon assembly is an important consideration to maintaining image quality. Deformation of even a single facet can result in unwanted image artifacts, such as banding. Historically, evaluation of polygon surface flatness has generally been confined to interferometric measures on static assemblies. While this provides useful information, it does not necessarily provide an accurate account of the flatness during operation of the a ROS subsystem in system equipment, such as a laser printer. For example, centrifical forces exerted on the polygon assembly during rotation can result in facet deformation. Therefore, techniques for dynamically determining flatness characteristics of facets are desirable.

A previous solution for testing a polygon assembly using a dynamic test setup is described in Kessler, et al., "Dynamic Optical Tests High Speed Polygon," Applied Optics, Vol. 20, No. 6, Mar. 15, 1981, pp. 1015-1019, the contents of which are fully incorporated herein by reference. The Kessler dynamic test setup uses an astigmatism generator with dual parallel plates inserted into the optical path at equal, but opposite, angles and a Ronchi with both vertical and 45 degree lines. The astigmatism generator angle is adjusted while moving a lens (L1) back and forth until the modulation patterns from both the vertical and 45 degree patterns peak at the same time. The polygon surface error is then calculated based on the rotation angle of the astigmatism generator. The Kessler approach was attempted and repeatability was found to be on the order of approximately 30 micrometers (1 sigma). This degree of repeatability is not acceptable. Therefore, improved techniques for dynamically determining flatness characteristics of facets are desirable.

INCORPORATION BY REFERENCE

Kessler et al., Dynamic Optical Tests of a High-Speed Polygon, Applied Optics, Vol. 20, No. 6, Mar. 15, 1981, pp. 1015-1019, is fully incorporated herein by reference.

BRIEF DESCRIPTION

In one aspect, a method for determining a flatness characteristic for a reflective facet of a polygon assembly is provided. In one embodiment, the method includes: a) rotating a polygon assembly comprising a plurality of reflective facets in a dynamic test setup at a speed the polygon assembly is expected to experience during operation of system equipment with a raster output scanning subsystem comprising the polygon assembly; b) selectively directing a light beam from a light source toward the rotating polygon assembly such that at least a portion of light from the light beam is reflected by consecutive reflective facets of the plurality of reflective facets during revolutions of the polygon assembly, reflected light from the corresponding reflective facet of the rotating polygon assembly passing through a first focusing lens that directs a first spot light toward a target having a plurality of spaced-apart bars arranged to form a grating pattern that blocks a first portion of the reflected light and allows a second portion of the reflected light to pass through to a second focusing lens, the second focusing lens directing a second spot light toward a light sensor, the light sensor detecting an intensity of the second spot light; and c) measuring the intensity of the second spot light over time during revolutions of the polygon assembly to obtain a plurality of intensity measurements for each reflective facet.

In another aspect, an apparatus for determining a flatness characteristic for a reflective facet of a polygon assembly is provided. In one embodiment, the apparatus includes a fixture, a motor controller, a light source, a light sensor, a first focusing lens, a target, a second focusing lens, and a system controller. The fixture is for receiving a polygon assembly under test with a plurality of reflective facets. The fixture is also for retaining the polygon assembly under test so that a flatness characteristic of at least one reflective facet can be determined via a dynamic test setup. The motor controller is for controlling rotation of the polygon assembly under test. The light source is for selectively directing a light beam toward the polygon assembly under test. The light sensor is for detecting at least a portion of light reflected by the polygon assembly under test. The first focusing lens is disposed between the polygon assembly under test and the light sensor. The target is disposed between the first focusing lens and the light sensor. The second focusing lens is disposed between the target and the light sensor. The system controller is for controlling the motor controller to rotate the polygon assembly under test at a speed the polygon assembly is expected to experience during operation of system equipment with a raster output scanning subsystem comprising the polygon assembly. The system controller is for controlling the light source to direct the light beam toward the rotating polygon assembly under test such that at least a portion of light from the light beam is reflected by consecutive reflective facets of the plurality of reflective facets during revolutions of the polygon assembly under test. The reflected light from the corresponding reflective facet of the rotating polygon assembly under test passing through the first focusing lens. The first focusing lens directing a first spot light toward the target. The target having a plurality of spaced-apart bars arranged to form a grating pattern that blocks a first portion of the reflected light and allows a second portion of the reflected light to pass through to the second focusing lens. The second focusing lens is for directing a second spot light toward the light sensor. The light sensor is for detecting an intensity of the second spot light. The system controller, in conjunction with the light sensor, is for measuring the intensity of the second spot light over time during revolutions of the polygon assembly under test to obtain a plurality of intensity measurements for each reflective facet.

In yet another aspect, a method for determining a flatness characteristic for a reflective facet of a polygon assembly is provided. In one embodiment, the method includes: a) rotating a motorized polygon assembly comprising a plurality of reflective facets in a dynamic test setup at a desired speed within a range of 20,000 to 30,000 revolutions per minute; b) selectively directing a light beam from a laser light source toward the rotating motorized polygon assembly such that at least a portion of light from the light beam is reflected by consecutive reflective facets of the plurality of reflective facets during revolutions of the motorized polygon assembly, reflected light from the corresponding reflective facet of the rotating motorized polygon assembly passing through a first focusing lens that directs a first spot light toward a Ronchi ruling that blocks a first portion of the reflected light and allows a second portion of the reflected light to pass through to a second focusing lens, the second focusing lens directing a second spot light toward a detector, the detector detecting an intensity of the second spot light; and c) measuring the intensity of the second spot light over time during at least three revolutions of the motorized polygon assembly to obtain a plurality of intensity measurements for each reflective facet.

DETAILED DESCRIPTION

This disclosure describes a technique for determining facet flatness for a polygon assembly or MPA while the assembly is operating at normal speed. A collimated light beam is reflected off the facet and focused via a lens (L1) on a Ronchi ruling. The illuminated Ronchi ruling is in turn imaged by a lens (L2) on a high speed detector. As the polygon assembly rotates, the focused beam traverses across the Ronchi ruling. The portion of the beam passed through and Ronchi ruling and, when imaged on the detector, results in the generation of a time varying signal that can be recorded and displayed on an oscilloscope. The magnitude of the time varying signal is dependent upon the quality of the L1 focus condition. The modulation pattern of the time varying signal is related to the construction of the Ronchi ruling and its blocking and non-blocking characteristics. The plane of peak focus can be determined by monitoring the magnitude of the modulation as the position of L1 is shifted along the optical axis. Modulation peaks at the plane of peak focus. If the facet is not flat, it will introduce power into the beam and result in a focus shift. The magnitude of the focus shift is a function of the surface curvature of the facet. Using the various embodiments described herein, facet surface deformation can be measured with the MPA operating at rated speed prior to assembly in a ROS module or subsystem.

Figure 1:
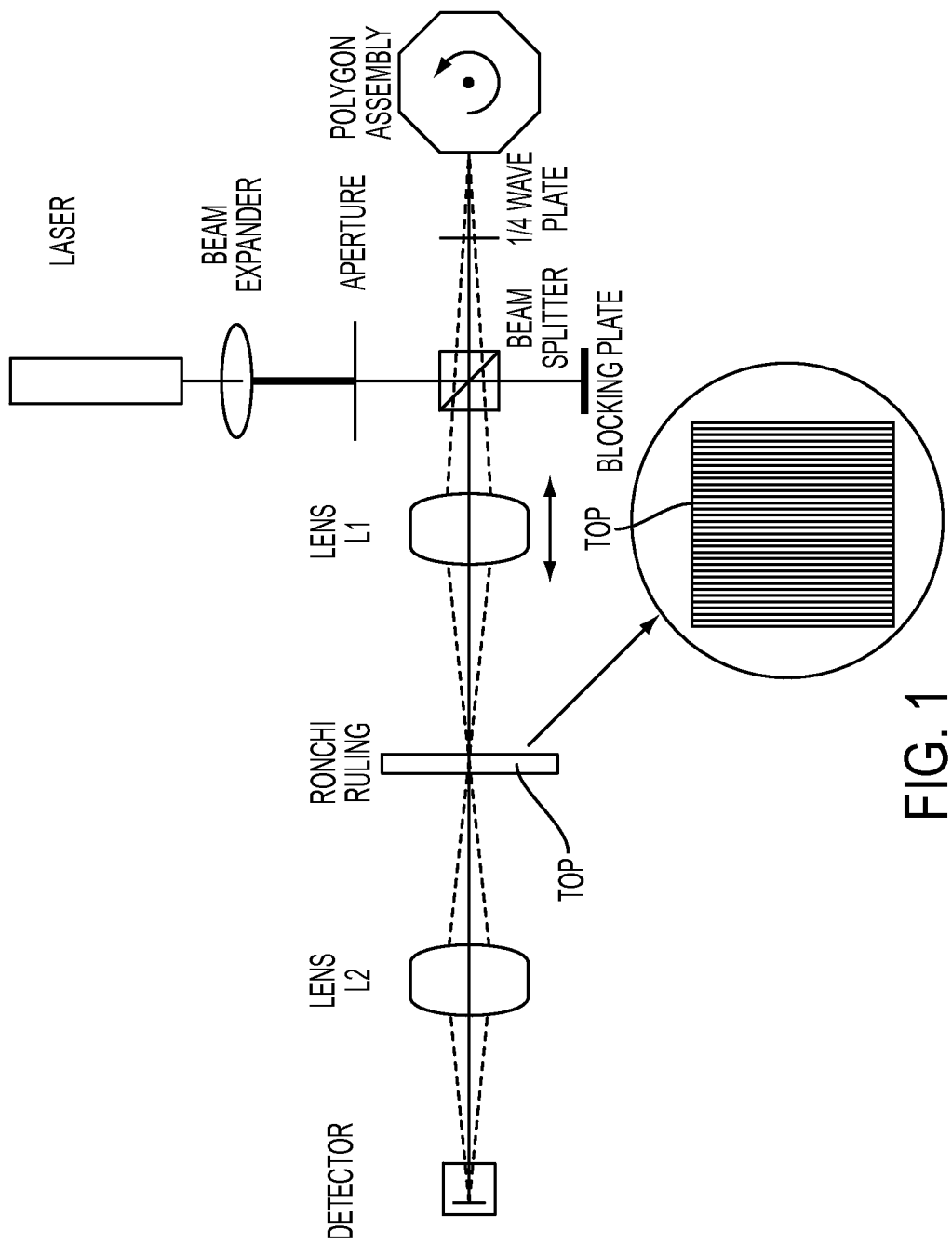
FIG. 1 is an exemplary embodiment of a dynamic test setup for determining a flatness characteristic for a reflective facet of a polygon assembly.

With reference to FIG. 1, an exemplary embodiment of a dynamic test setup for determining a flatness characteristic for a reflective facet of a polygon assembly includes a laser, beam expander, aperture, beam splitter, quarter wave plate, blocking plate, lens L1, Ronchi ruling, lens L2, and detector. The dynamic test setup utilizes a laser as the light source. The beam is passed through a beam expander and an adjustable aperture (e.g., field stop). The aperture provides flexibility in the diameter of the sampling beam and thus the area of the facet of the motorized polygon assembly (MPA) to be interrogated. The beam then passes through a polarizing beam splitter where either the S or P polarization is reflected toward the facet (i.e., mirror). The opposing polarization (i.e., P or S) is passed to the blocking plate where it is absorbed. A quarter wave plate is installed between the beam splitter and MPA to allow the reflected beam to pass back through the beam splitter after reflection from the facet. Once the reflected beam has passed through the beam splitter it is focused by lens L1 on a Ronchi ruling oriented perpendicular to the direction of beam travel. In other words, gratings in the Ronchi ruling are oriented perpendicular to rotation of the MPA. The position of lens L1 is adjustable along the optical axis. Lens L2 images reflected light that passes through the Ronchi ruling (i.e., target) on a high speed photodiode detector.

Figure 2:
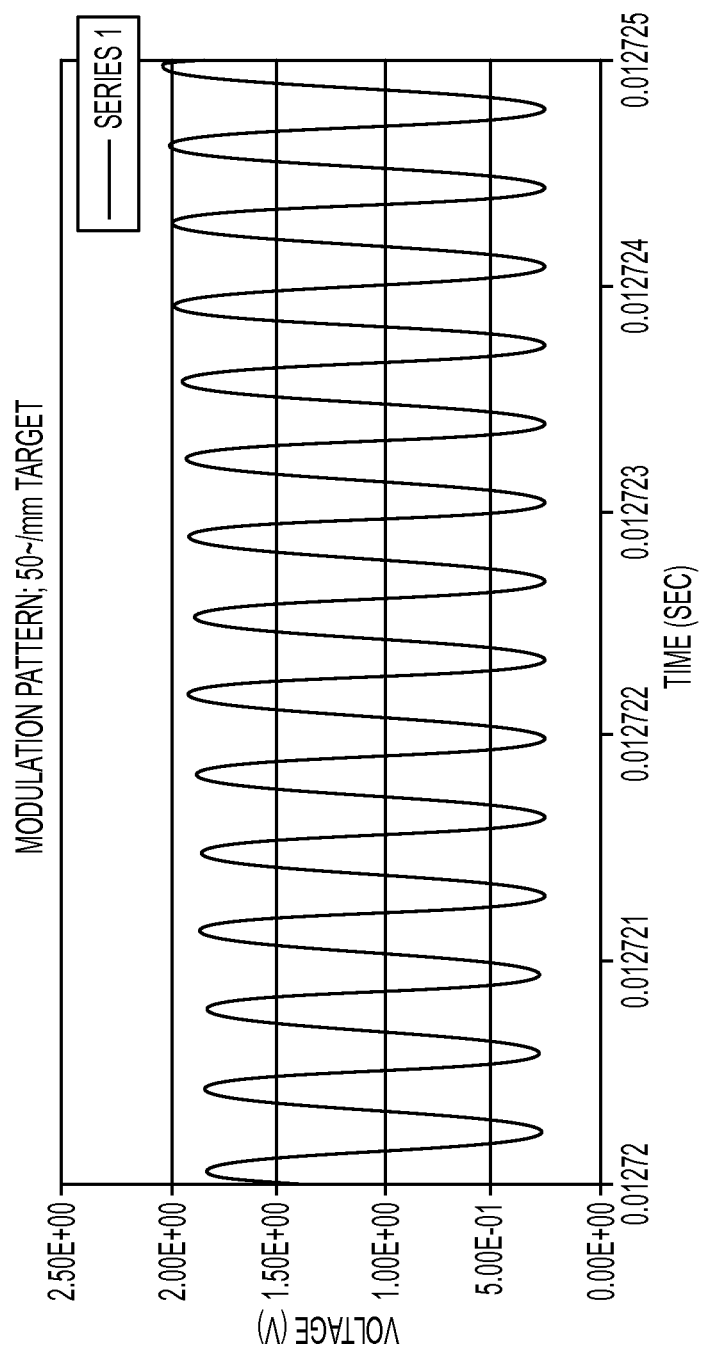
FIG. 2 is a signal trace of light intensity measurements from a light beam reflected by a facet and passed through a Ronchi ruling showing a modulation pattern.

With reference to FIG. 2, a signal trace of light intensity measurements from a light beam reflected by a facet and passed through a Ronchi ruling shows a modulation pattern. When the MPA rotates, the beam focused by lens L1 traverses across the Ronchi ruling and results in the projection of a time varying series of light and dark patches onto the detector. This detector signal is amplified and fed into an oscilloscope for capture and analysis.

Figure 3:
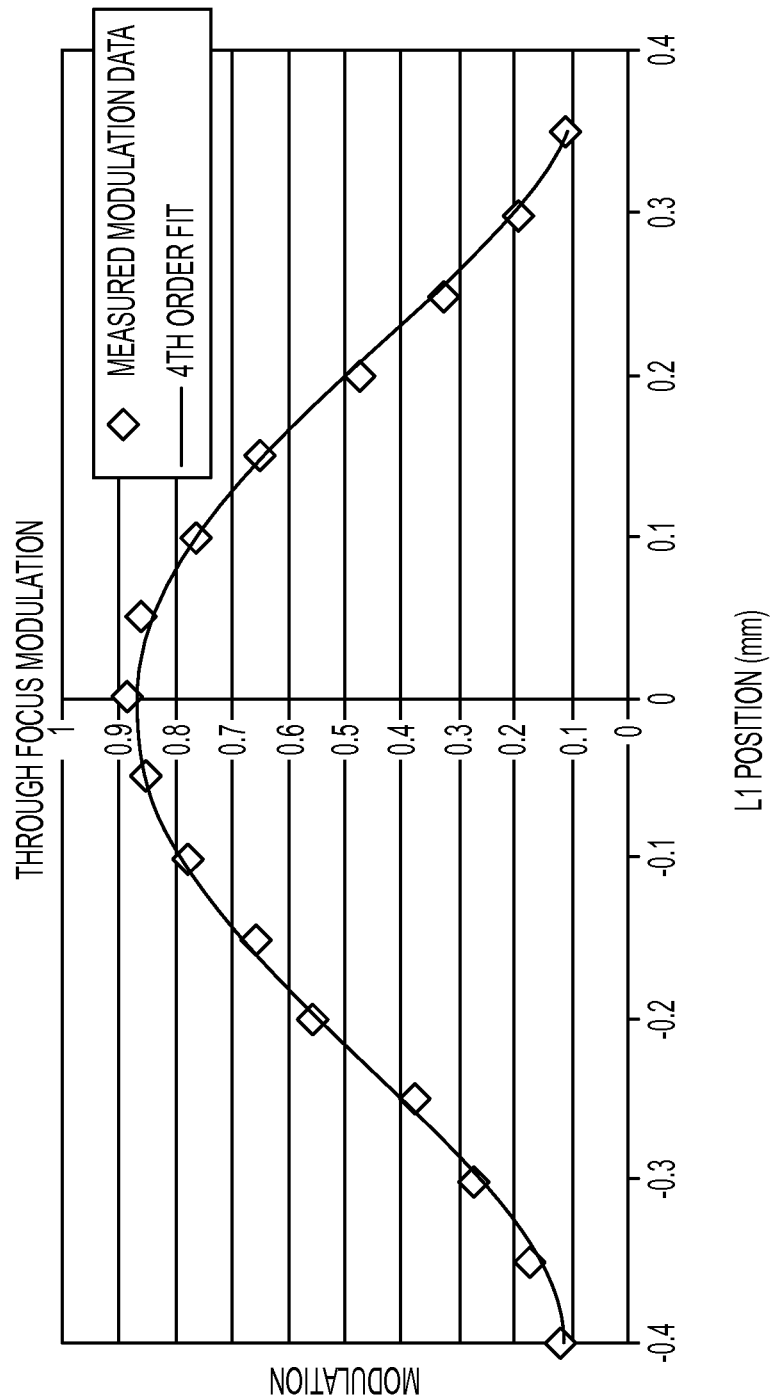
FIG. 3 is a plot of average peak light intensity measurements for different select positions of lens L1 and a curve fitted to the plotted points.

With reference to FIG. 3, a plot of average peak light intensity measurements for different select positions of lens L1 is shown along with a curve fitted to the plotted points. The plane of peak focus can be determined by monitoring the magnitude of the modulation as the position of lens L1 is shifted along the optical axis. A curve fit is applied to the through focus modulation data and the peak determined. The modulation pattern i maximized at the plane of peak focus.

Figure 4:
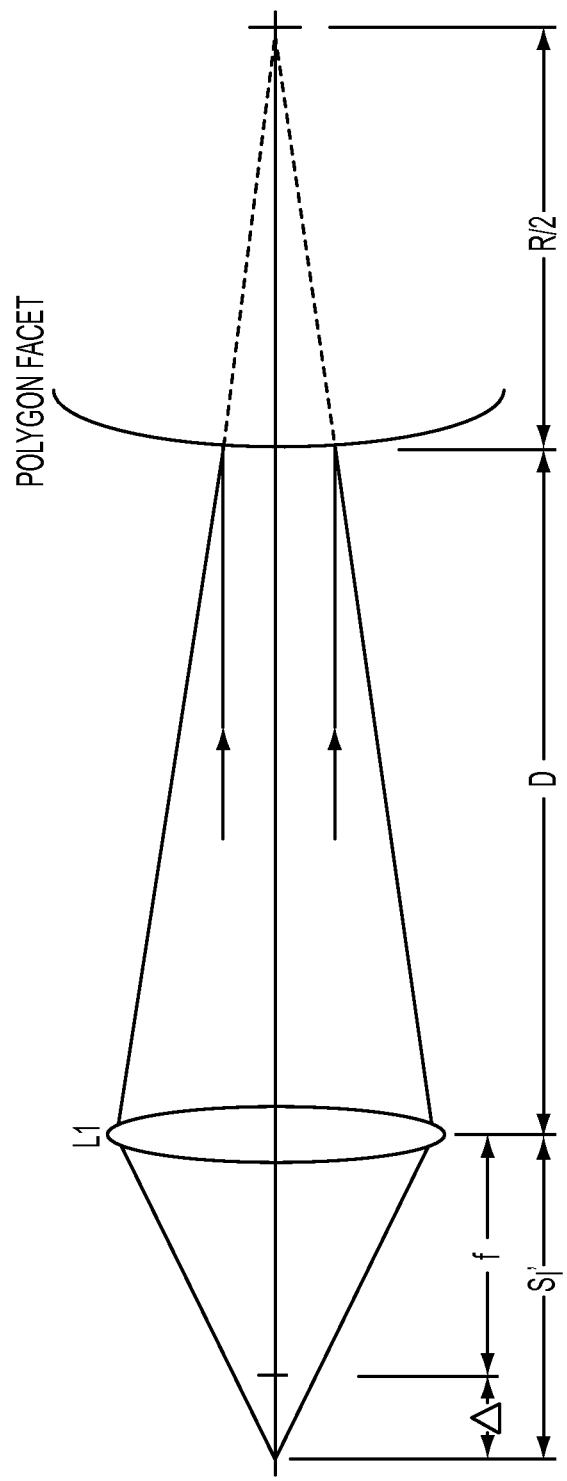
FIG. 4 is functional diagram of an exemplary embodiment of a dynamic test setup that illustrates the parameters pertinent to calculating a radius of curvature for a facet.

With reference to FIG. 4, functional diagram of an exemplary embodiment of a dynamic test setup illustrates the parameters pertinent to calculating a radius of curvature for a facet. In an ideal system, the facet would be perfectly flat and the peak of the through focus modulation curve would correspond to the focal length of lens L1. However, as the MPA rotates centrifugal forces may distort the facet surface and introduce power into the beam. Finite element analysis (FEA) has indicated that operation of an iGen MPA at rated speed induces a convex spherical curvature on the surface. If this occurs, the position of peak focus will shift. The magnitude of the shift is a measure of the facet surface curvature.

The distance between the polygon facet and the first lens L1 is the distance D. The focal length of the first lens L1 is f. The distance between the focal point of lens L1 and conversion point of lens L1 is the conversion distance $\Delta$, while the sum of conversion distance $\Delta$ and the focal length f is the image distance $S_l$. The polygon focal distance is also presented as R/2. Light reflected off the polygon facet will be reflected and pass through the first lens L1 and then converge to a point. The distance between the converge point and the point at which the light beams reflected off of flat surface would be the distance used to calculate modulation.

A simple relationship exists between the facet curvature and the magnitude of the shift. For a thin lens, the object and image positions are given by the following lens equation:

$$1/s_l + 1/s'_l = 1/f \quad (1),$$

where $s_l$ is the object distance, $s'_l$ is the image distance, and f is the lens focal length.

For a spherical mirror, the object and image positions are given by the following lens equation:

$$1/s_m + 1/s'_m = 2/R \quad (2),$$

where $s_m$ is the object distance, $s'_m$ is the image distance, and R is the mirror radius.

With a collimated laser beam as the source, $s_m$ is infinite. Therefore, $s'_m = R/2$. With power introduced into the system from the facet, $s_l = s'_m + D$, where D is the distance between lens L1 and the facet surface. Substitutions using these equations result in the following sequence of equations to derive equation (3):

$$s_l = s'_m + D$$

$$s'_m = R/2$$

$$s_l = R/2 + D$$

$$s_l - D = R/2$$

$$R = 2(s_l - D) \quad (3)$$

Setting $s'_l = f + \Delta$, the equation (1) may be solved for $s_l$. The $s_l$ solution may be substituted into equation (3) to derive the value of R using the following equation:

$$1/s_l + 1/s'_l = 1/f$$

$$s'_l = f + \Delta$$

$$1/s_l + 1/(f + \Delta) = 1/f$$

$$s_l = f(f + \Delta)/\Delta$$

$$R = 2(s_l - D)$$

$$R = 2((f(f + \Delta)/\Delta) - D) \quad (4)$$

In practice, the frequency of the Ronchi ruling, focal length of lens L1, and diameter of the laser beam can be selected to yield the desired measurement sensitivity. The slope of the through focus modulation transfer function (MTF) performance of lens L1 is a function of frequency. A frequency can be selected that yields adequate curve definition for a reasonable translation range of lens L1 to provide for proper curve fitting. Beam diameter and lens focal length impact the minimum achievable spot size at the Ronchi ruling (i.e., target) and can be selected to avoid interference effects when the target is imaged on the detector.

While the above discussion has been relative to a single facet, the technique can be applied to all faces of the MPA. If an index mark is provided on top of the MPA, an emitter/detector pair can be used to read the index mark and generate a trigger to initiate the collection and correlation of intensity measurements in conjunction with the detector and, for example, an oscilloscope. In this fashion, it is possible to correlate the intensity measurements and corresponding facet deformation to an individual facet.

For example, an exemplary embodiment of a dynamic test setup for determining a flatness characteristic for a reflective facet of a polygon assembly may include a 50 cycle/millimeter Ronchi ruling, double Gaussian lenses L1 and L2, and a Hamamatsu avalanche photodiode. The focal length of the lens L1 may be selected based on the desired beam diameter at the facet as well as the desired spot size at the Ronchi ruling. With a 50 cycle/millimeter target, the spot size at the Ronchi could be on the order of 10 micrometers to avoid interference effects. The desired beam size at the facet could be approximately 7 millimeter. With these constraints, a lens focal length of approximately 71 millimeter may be selected. For example, this arranged yielded a full width at half maximum (FWHM) spot size at the Ronchi ruling of approximately 6 micrometers. A shorter focal length lens could be used. A mark on the top of the MPA may be read by an emitter/detector pair and used to trigger the start of intensity measurements using the photodiode and an oscilloscope so that data can be correlated to a particular facet.

With the exemplary hardware configured as described, data for each facet of an iGen MPA was initially acquired by manually translating lens L1 through peak focus in 50 micrometer increments. For example, data may be collected at 16 different positions of lens L1. This would provide data over a range of 750 micrometers (i.e., 15 increments of 50 micrometers). At each position, the modulation waveform from each facet was captured and stored to a storage device, such as a hard disk drive. For example, if the polygon is formed by eight facets (i.e., 8-sided polygon), there will be eight modulation waveforms. The average modulation of each waveform was calculated, a fourth order regression performed, and the peak of the regressed curve determined. For example, these calculations may be performed using an Excel spreadsheet. The resolution of this method, in relation to the uncertainty in determining peak focus, was on the order of approximately six micrometers. To further reduce the measurement uncertainty, the data acquisition method was modified so that three captures (i.e., revolutions of the MPA) were made of the modulation pattern for each facet at each position of lens L1. Thus, one run produced three sets of measurements for each facet at each position of lens L1. A further reduction of measurement uncertainty was achieved after a total of ten runs were made. With the averaging that this many samples enabled, measurement uncertainty in determining the location of peak focus was reduced to approximately one micrometer. The system was automated to facilitate acquiring this volume of data.

Figure 5:
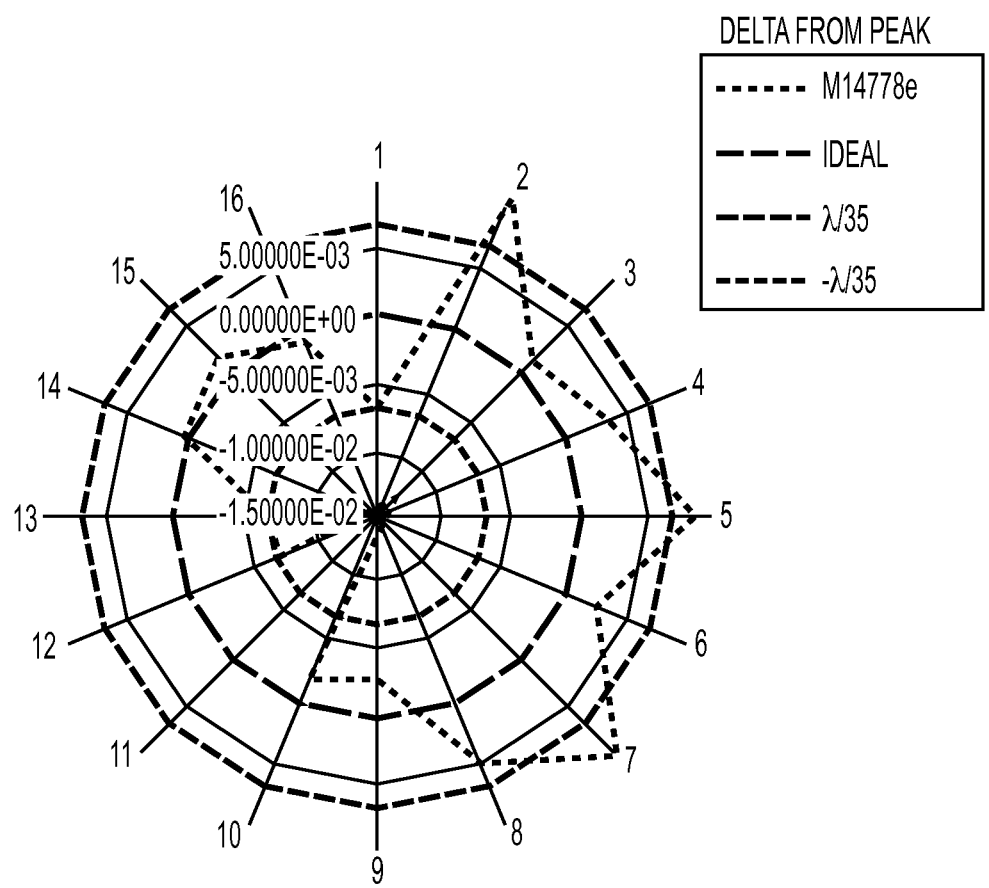
FIG. 5 is a polar plot of calculated radius of curvature values for facets of an exemplary polygon assembly along with the corresponding ideal and threshold values.

With reference to FIG. 5, a polar plot shows the calculated radius of curvature values for facets of an exemplary polygon assembly along with the corresponding ideal and threshold values. Variation in MPA surface flatness which is usually quite small. Facet-to-facet variations are more readily visualized when the deviation of each facet from the mean value is examined. As a point of reference, when lens L1 has a focal length of approximately 71 millimeters, a shift in peak focus of approximately 6.5 micrometers corresponds to a surface flatness of $\lambda/35$.

Figure 6:
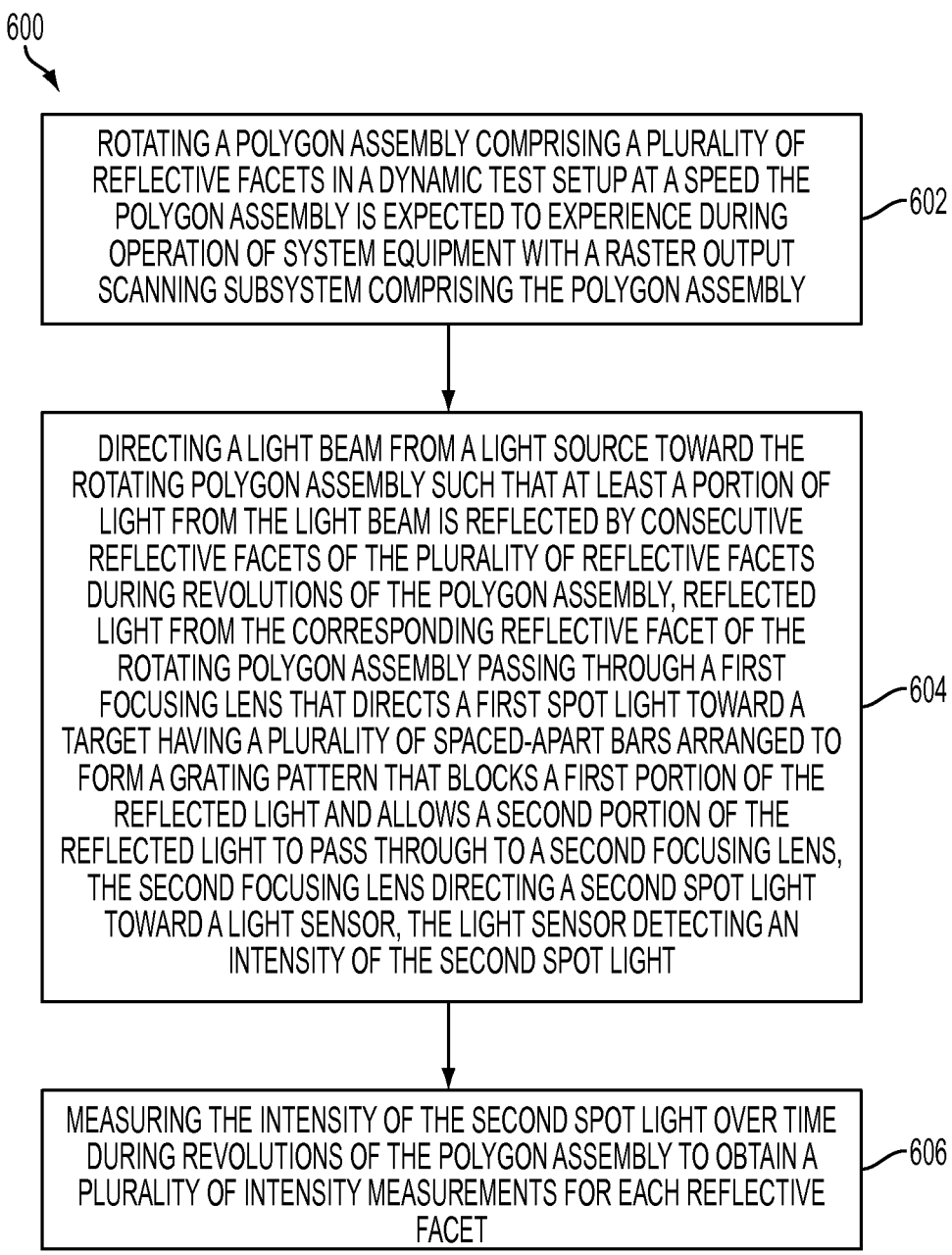
FIG. 6 is a flowchart of an exemplary embodiment of a process for determining a flatness characteristic of a reflective facet of a polygon assembly.

With reference to FIG. 6, an exemplary embodiment of a process 600 for determining a flatness characteristic for a reflective facet of a polygon assembly begins at 602 where a polygon assembly comprising a plurality of reflective facets in a dynamic test setup is rotated at a speed the polygon assembly is expected to experience during operation of system equipment with a raster output scanning subsystem comprising the polygon assembly. Next, a light beam from a light source is selectively directed toward the rotating polygon assembly such that at least a portion of light from the light beam is reflected by consecutive reflective facets of the plurality of reflective facets during revolutions of the polygon assembly. Reflected light from the corresponding reflective facet of the rotating polygon assembly passing through a first focusing lens that directs a first spot light toward a target having a plurality of spaced-apart bars arranged to form a grating pattern that blocks a first portion of the reflected light and allows a second portion of the reflected light to pass through to a second focusing lens. The second focusing lens directing a second spot light toward a light sensor. The light sensor detecting an intensity of the second spot light. At 606, the intensity of the second spot light is measured over time during revolutions of the polygon assembly to obtain a plurality of intensity measurements for each reflective facet.

In another embodiment of the process 600, the directing in 604 and the measuring in 606 are performed after the polygon assembly is rotating at a desired speed. In a further embodiment of the process 600, the desired speed is in a range of 20,000 to 30,000 revolutions per minute. In yet another embodiment of the process 600, the measuring in 606 is performed for at least three revolutions of the polygon assembly.

The desired speed may be set and detected by a motor controller associated with the polygon assembly. The motor controller may provide a signal, such as an MPA lock signal, after the polygon assembly reaches a steady state or stable condition at the desired speed to a system controller. The system controller may be able to set or program the desired speed in the motor controller. In other embodiments, any suitable means for setting and detecting the desired speed of the polygon assembly may be implemented.

In still another embodiment of the process 600, the polygon assembly includes an index mark suitable for distinguishing revolutions of the polygon assembly. In this embodiment, the process 600 also includes detecting the index mark during revolutions of the polygon assembly using an emitter/detector device. Each plurality of intensity measurements from 606 is correlated to individual reflective facets of the polygon assembly based at least in part on detection of the index mark. In a further embodiment, the process 600 also includes generating a trigger to initiate the measuring in 606 in conjunction with detection of the index mark after the rotating polygon assembly has reached a desired speed. In another further embodiment, the process 600 also includes generating a trigger in conjunction with detection of the index mark during each revolution of the polygon assembly to facilitate the correlation of each plurality of intensity measurements from 606 to individual reflective facets.

Figure 7:
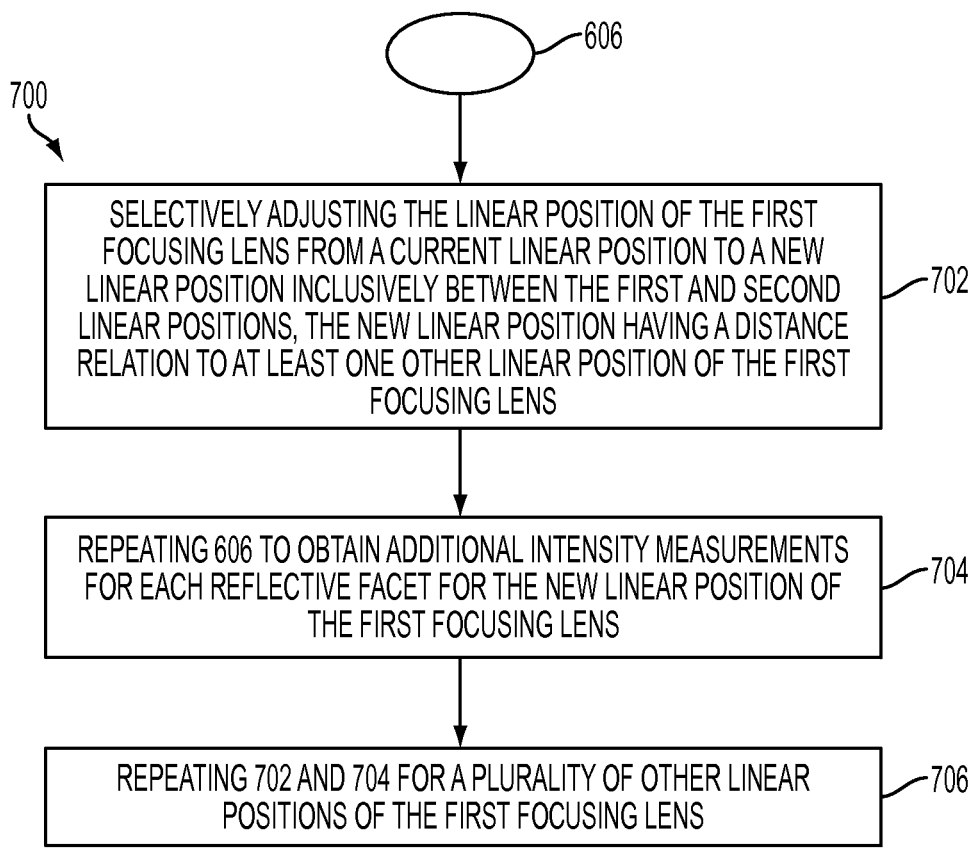
FIG. 7, in conjunction with FIG. 6, is a flowchart of another exemplary embodiment of a process for determining a flatness characteristic of a reflective facet of a polygon assembly.

With reference to FIGS. 6 and 7, another exemplary embodiment of a process 700 for determining a flatness characteristic for a reflective facet of a polygon assembly includes the process 600 of FIG. 6 and continues at 702. In the process 700, a linear position of the first focusing lens is adjustable from a first linear position closest to the polygon assembly to a second linear position farthest from the polygon assembly. At 702, the linear position of the first focusing lens is selectively adjusted from a current linear position to a new linear position inclusively between the first and second linear positions. The new linear position having a distance relation to at least one other linear position of the first focusing lens. Next, the process 700 repeats the measuring in 606 to obtain additional intensity measurements for each reflective facet for the new linear position of the first focusing lens (704). At 706, the process 700 repeats the selective adjusting in 702 and the measuring in 704 for a plurality of other linear positions of the first focusing lens.

In another embodiment of the process 700, the linear positions of the first focusing lens at which the intensity of the second spot light is measured include the first linear position, the second linear position, and other linear positions between the first and second linear positions at about 50 micrometer increments. In still another embodiment of the process 700, the polygon assembly includes an index mark suitable for distinguishing revolutions of the polygon assembly. In this embodiment, the process 700 also includes detecting the index mark during revolutions of the polygon assembly using an emitter/detector device. A trigger is generated to initiate each measuring in 704 in conjunction with detection of the index mark after the first focusing lens has reached the corresponding new linear position.

Figure 8:
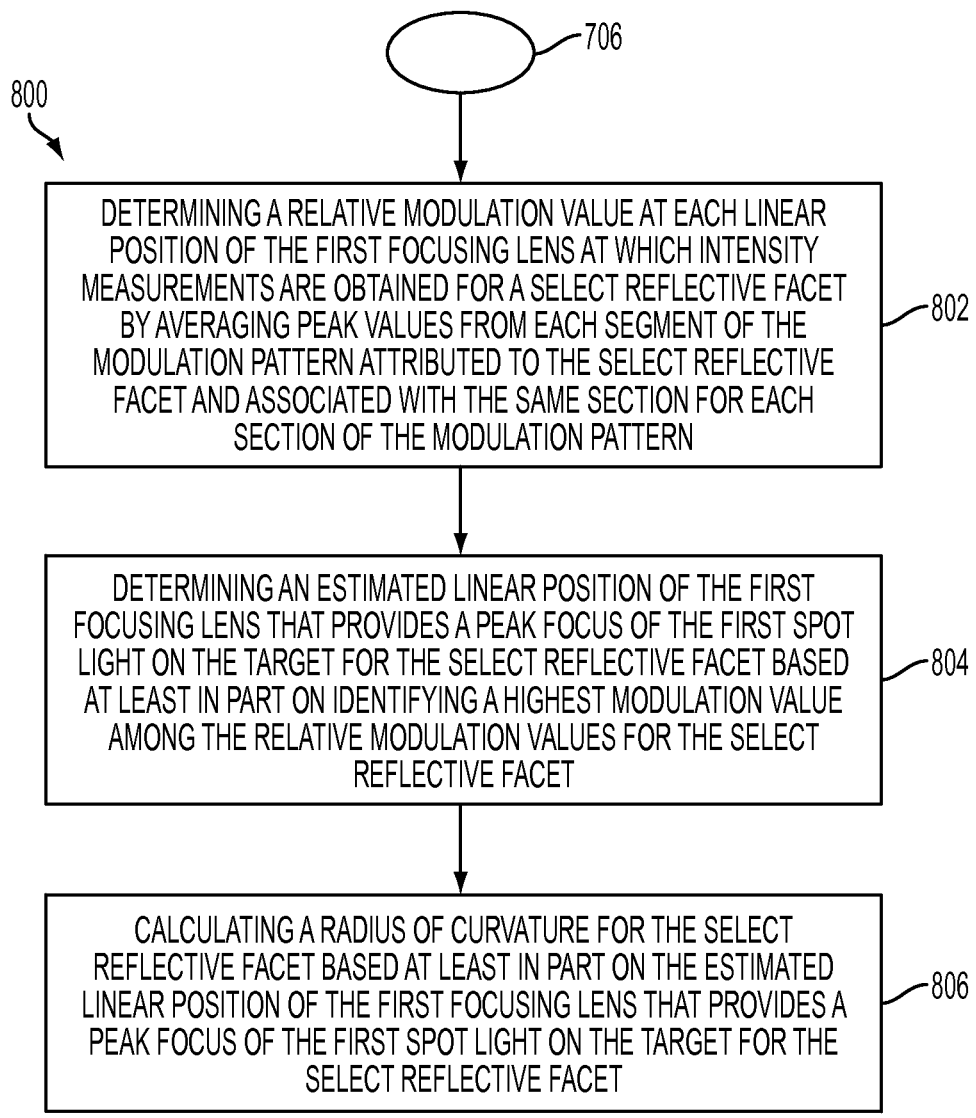
FIG. 8, in conjunction with FIGS. 6 and 7, is a flowchart of yet another exemplary embodiment of a process for determining a flatness characteristic of a reflective facet of a polygon assembly.

With reference to FIGS. 6-8, another exemplary embodiment of a process 800 for determining a flatness characteristic for a reflective facet of a polygon assembly includes the processes 600 and 700 of FIGS. 6 and 7 and continues at 802. In the process 800, when arranged in time relation, the intensity measurements correspond to a modulation pattern representative of the intensity of the second spot light over time. The modulation pattern including sections associated with each linear position of the first focusing lens at which intensity measurements are obtained. Each section including segments associated with each consecutive reflective facet for each revolution of the polygon assembly at the corresponding linear position. At 802, a relative modulation value at each linear position of the first focusing lens at which intensity measurements are obtained for a select reflective facet is determined by averaging peak values from each segment of the modulation pattern attributed to the select reflective facet and associated with the same section for each section of the modulation pattern. Next, an estimated linear position of the first focusing lens that provides a peak focus of the first spot light on the target for the select reflective facet is determined based at least in part on identifying a highest modulation value among the relative modulation values for the select reflective facet (804). At 806, a radius of curvature for the select reflective facet is calculated based at least in part on the estimated linear position of the first focusing lens that provides a peak focus of the first spot light on the target for the select reflective facet.

In another embodiment, the process 800 also includes arranging the relative modulation values for the select reflective facet in distance relation of the linear positions of the first focusing lens for the corresponding sections of the modulation pattern. A curve fitting algorithm is applied to the arrangement of relative modulation values to provide a curve for the select reflective facet that fits the corresponding relative modulation values. The estimated linear position of the first focusing lens that provides the peak focus of the first spot light on the target for the select reflective facet is determined based at least in part on the corresponding curve.

In yet another embodiment, the process 800 also includes comparing the calculated radius of curvature for the select reflective facet to a minimum radius of curvature for individual reflective facets of the polygon assembly. In this embodiment, the process 800 determines the polygon assembly is not suitable for use in the raster output scanning subsystem if the calculated radius of curvature is less than the minimum radius of curvature.

Figure 9:
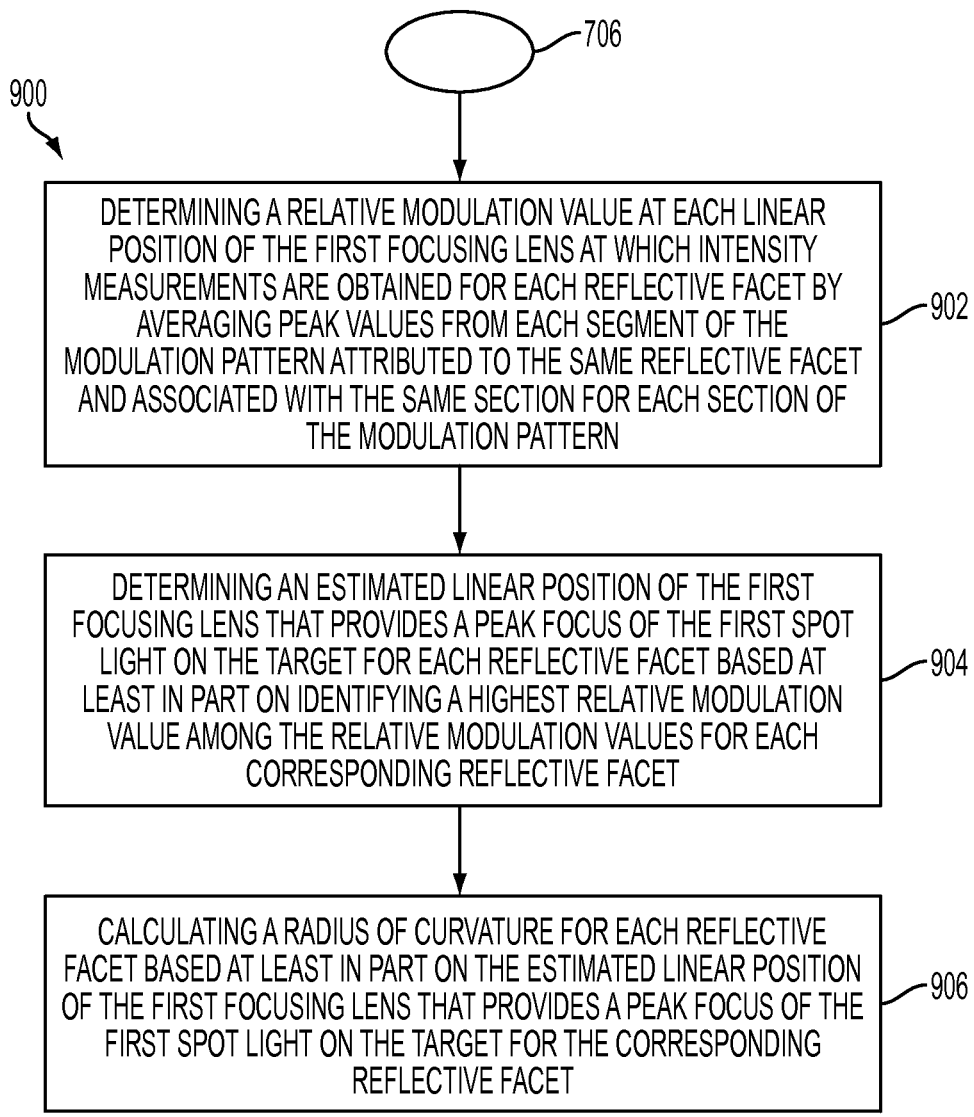
FIG. 9, in conjunction with FIGS. 6 and 7, is a flowchart of still another exemplary embodiment of a process for determining a flatness characteristic of a reflective facet of a polygon assembly.

With reference to FIGS. 6, 7, and 9, another exemplary embodiment of a process 900 for determining a flatness characteristic for a reflective facet of a polygon assembly includes the processes 600 and 700 of FIGS. 6 and 7 and continues at 902. In the process 900, when arranged in time relation, the intensity measurements correspond to a modulation pattern representative of the intensity of the second spot light over time. The modulation pattern including sections associated with each linear position of the first focusing lens at which intensity measurements are obtained. Each section including segments associated with each consecutive reflective facet for each revolution of the polygon assembly at the corresponding linear position. At 902, a relative modulation value at each linear position of the first focusing lens at which intensity measurements are obtained for each reflective facet is determined by averaging peak values from each segment of the modulation pattern attributed to the same reflective facet and associated with the same section for each section of the modulation pattern. Next, an estimated linear position of the first focusing lens that provides a peak focus of the first spot light on the target for each reflective facet is determined based at least in part on identifying a highest relative modulation value among the relative modulation values for each corresponding reflective facet (904). At 906, a radius of curvature for each reflective facet is calculated based at least in part on the estimated linear position of the first focusing lens that provides a peak focus of the first spot light on the target for the corresponding reflective facet.

In another embodiment, the process 900 also includes determining an observed deviation of the calculated radiuses of curvature for the polygon assembly by determining a difference between a maximum value and a minimum value among the calculated radiuses of curvature. The observed deviation is compared to a maximum deviation for radiuses of curvature of reflective facets for the polygon assembly. In this embodiment, the process 900 determines the polygon assembly is not suitable for use in the raster output scanning subsystem if the observed deviation exceeds the maximum deviation.

Figure 10:
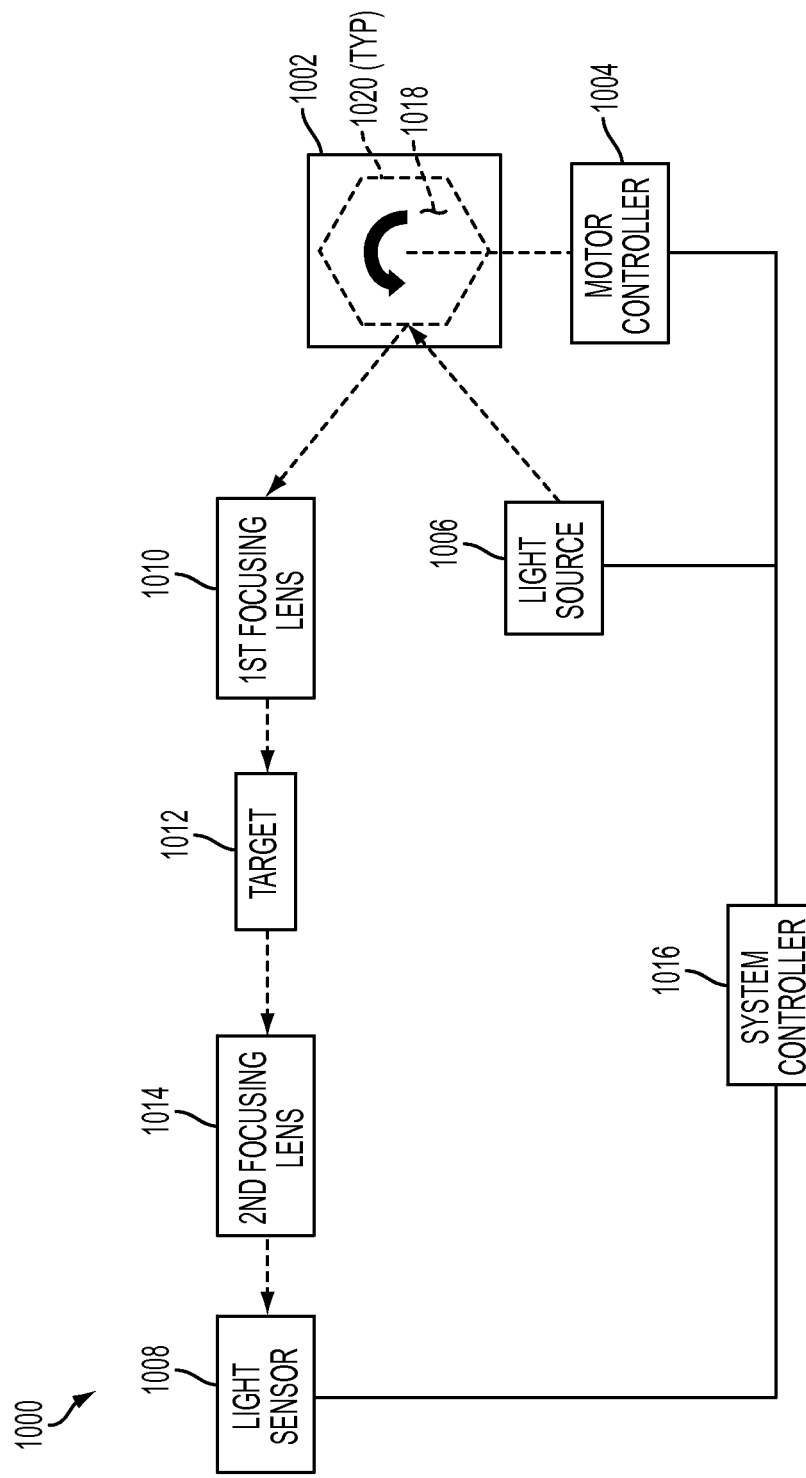
FIG. 10 is a block diagram of another exemplary embodiment of a dynamic test setup for determining a flatness characteristic of a reflective facet of a polygon assembly.

With reference to FIG. 10, an exemplary embodiment of a dynamic test setup 1000 for determining a flatness characteristic for a reflective facet of a polygon assembly includes a fixture 1002, a motor controller 1004, a light source 1006, a light sensor 1008, a first focusing lens 1010, a target 1012, a second focusing lens 1014, and a system controller 1016. The fixture 1002 for receiving a polygon assembly under test 1018. The polygon assembly 1018 having a plurality of reflective facets 1020. The fixture 1002 for retaining the polygon assembly under test 1016 so that a flatness characteristic of at least one reflective facet 1020 can be determined via the dynamic test setup 1000. The motor controller 1004 for controlling rotation of the polygon assembly under test 1018. The light source 1006 for selectively directing a light beam toward the polygon assembly under test 1018. The light sensor 1008 for detecting at least a portion of light reflected by the polygon assembly under test 1018.

The first focusing lens 1010 disposed between the polygon assembly under test 1018 and the light sensor 1008. The target 1012 disposed between the first focusing lens 1010 and the light sensor 1012. The second focusing lens 1014 disposed between the target 1012 and the light sensor 1008.

The system controller 1016 for controlling the motor controller 1004 to rotate the polygon assembly under test 1018 at a speed the polygon assembly 1018 is expected to experience during operation of system equipment with a raster output scanning subsystem comprising the polygon assembly. The system controller 1016 for controlling the light source 1006 to direct the light beam toward the rotating polygon assembly under test 1018 such that at least a portion of light from the light beam is reflected by consecutive reflective facets 1020 of the plurality of reflective facets 1020 during revolutions of the polygon assembly under test 1018. Reflected light from the corresponding reflective facet 1020 of the rotating polygon assembly under test 1018 passing through the first focusing lens 1010. The first focusing lens 1010 directing a first spot light toward the target 1012. The target 1012 having a plurality of spaced-apart bars arranged to form a grating pattern that blocks a first portion of the reflected light and allows a second portion of the reflected light to pass through to the second focusing lens 1014. The second focusing lens 1014 for directing a second spot light toward the light sensor 1008. The light sensor 1008 for detecting an intensity of the second spot light. The system controller 1016, in conjunction with the light sensor 1008, for measuring the intensity of the second spot light over time during revolutions of the polygon assembly under test 1018 to obtain a plurality of intensity measurements for each reflective facet 1020.

In one embodiment of the dynamic test setup 1000, the fixture 1002 may include a motor adapted to receive the polygon assembly under test 1018. In this embodiment, the motor is in operative communication with the motor controller 1004. In the embodiment being described, the motor controller 1004, motor, and fixture 1002 may be integrated in any suitable combination.

In another embodiment of the dynamic test setup 1000, the polygon assembly under test 1018 is motorized. In this embodiment, a motor and polygon assembly are integrated to form the polygon assembly under test 1018. In the embodiment being described, the motor in the polygon assembly under test 1018 is in operative communication with the motor controller 1004. In this embodiment, the motor controller 1004 and fixture 1002 may be integrated.

In yet another embodiment of the dynamic test setup 1000, the light source 1006 includes a laser assembly. In this embodiment, the laser assembly is for providing the light beam. In other embodiments, any suitable type of light sources may be used to provide the light beam. In a further embodiment of the dynamic test setup 1000 in which a laser assembly provides the light beam, the laser assembly may include a laser source, an aperture, and a beam expander. In this embodiment, the laser source is for providing the light beam. The aperture for directing the light beam toward the polygon assembly under test. The beam expander disposed between the laser source and the aperture.

Figure 11:
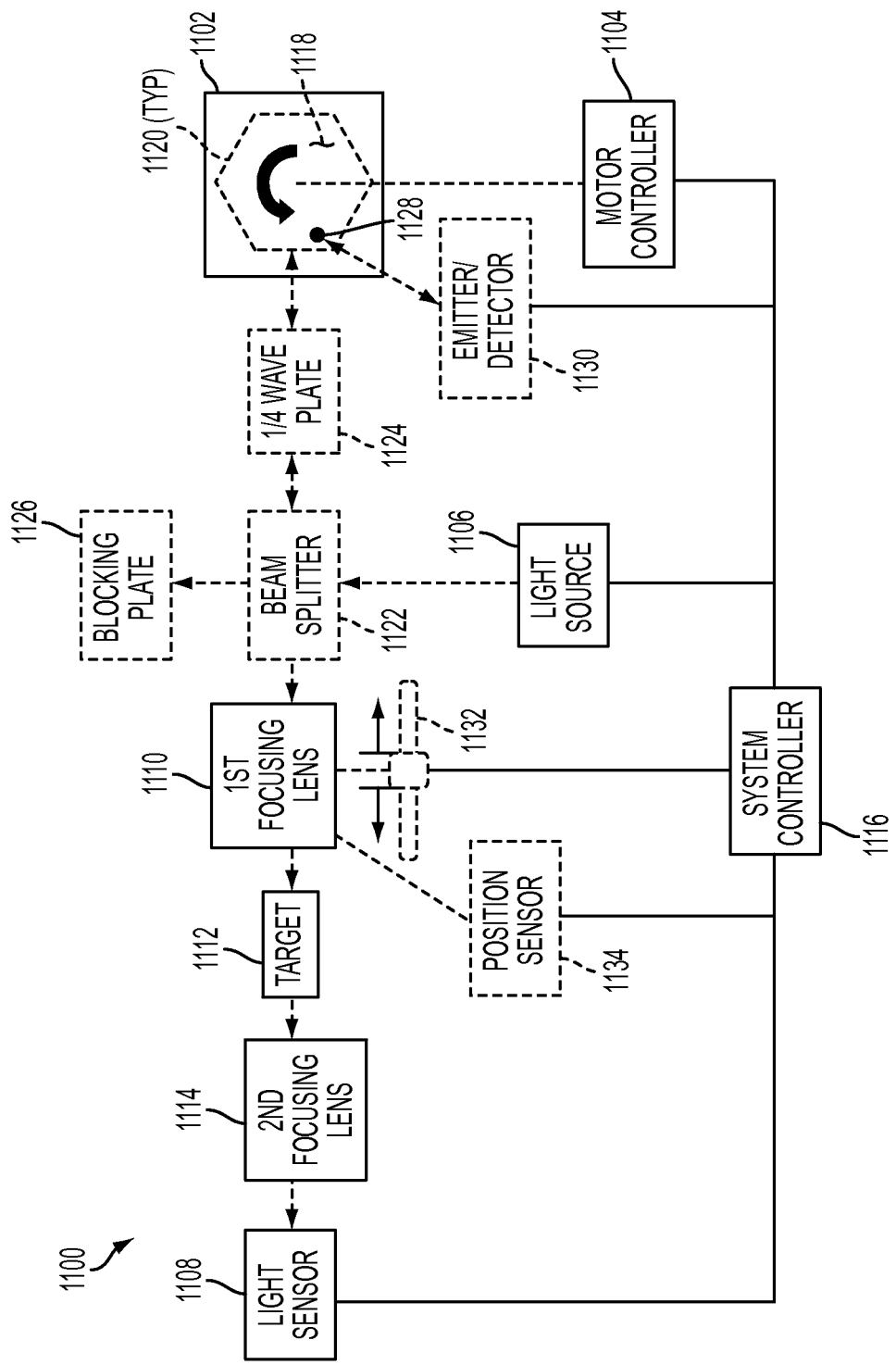
FIG. 11 is a block diagram of yet another exemplary embodiment of a dynamic test setup for determining a flatness characteristic of a reflective facet of a polygon assembly.

With reference to FIG. 11, another exemplary embodiment of a dynamic test setup 1100 for determining a flatness characteristic for a reflective facet of a polygon assembly includes a fixture 1102, a motor controller 1104, a light source 1106, a light sensor 1108, a first focusing lens 1110, a target 1112, a second focusing lens 1114, a system controller 1116, a polarizing beam splitter 1122, a quarter wave plate 1124, and a blocking plate. In this embodiment, the fixture 1102, motor controller 1104, light source 1106, light sensor 1108, first focusing lens 1110, target 1112, second focusing lens 1114, and system controller 1116 operate in similar fashion to operations described above for like numbered components of the dynamic test setup 1000 of FIG. 10. The differences in the operation of these components are described below.

In the dynamic test setup 1100 of FIG. 11, the polarizing beam splitter 1122 is disposed between the light source 1106 and the polygon assembly under test 1118. The quarter wave plate 1124 is disposed between the polarizing beam splitter 1122 and the polygon assembly under test 1118. The blocking plate 1126 is position in relation to the polarizing beam splitter 1122. In this embodiment, the light beam from the light source 1106 is directed through the polarizing beam splitter 1122 toward the rotating polygon assembly under test 1118 such that S or P polarized light from the light beam is reflected by the consecutive reflective facets 1120. The polarizing beam splitter 1122 allows the corresponding opposite P or S polarized light to pass through to the blocking plate 1126. Reflected polarized light from the corresponding reflective facet 1120 of the rotating polygon assembly under test 1118 passes through the quarter wave plate 1124 and the polarizing beam splitter 1122 to the first focusing lens 1110.

With reference again to FIG. 10, in still yet another embodiment of the dynamic test setup 1000, the spaced-apart bars in the target 1012 are substantially perpendicular to a direction of rotation of the polygon assembly under test 1018 such that the first spot light scans across the spaced-apart bars for each reflective facet 1020 during each revolution of the polygon assembly 1018. In another embodiment of the dynamic test setup 1000, the target 1012 includes a Ronchi ruling. In other embodiments, any suitable type of target 1012 may be used. In yet another embodiment of the dynamic test setup 1000, the light sensor 1008 includes a photodiode detector. In other embodiments, the light sensor 1008 may include any suitable type of detector or sensor.

With reference again to FIG. 11, in another embodiment of the dynamic test setup 1100, the polygon assembly under test 1118 includes an index mark 1128 suitable for distinguishing revolutions of the polygon assembly under test 1118. In this embodiment, the dynamic test setup 1100 may also include an emitter/detector device 1130 in operative communication with the system controller 1116 for detecting the index mark 1128 during revolutions of the polygon assembly under test 1118. In the embodiment being described, the system controller 1116 correlates each plurality of intensity measurements to individual reflective facets 1120 of the polygon assembly under test 1118 based at least in part on detection of the index mark 1128. In a further embodiment of the dynamic test setup 1100, the system controller 1116 generates a trigger to initiate the measuring of the intensity of the second spot light in conjunction with detection of the index mark 1128 after the rotating polygon assembly under test 1118 has reached a desired speed.

The desired speed may be set and detected by a motor controller associated with the polygon assembly. The motor controller may provide a signal, such as an MPA lock signal, after the polygon assembly reaches a steady state or stable condition at the desired speed to a system controller. The system controller may be able to set or program the desired speed in the motor controller. In other embodiments, any suitable means for setting and detecting the desired speed of the polygon assembly may be implemented.

In another further embodiment of the dynamic test setup 1100, the system controller 1116 generates a trigger in conjunction with detection of the index mark 1128 during each revolution of the polygon assembly under test 1118 to facilitate the correlation of each plurality of intensity measurements to individual reflective facets 1120.

With continuing reference again to FIG. 11, in yet another embodiment, the dynamic test setup 1100 may also include an actuator 1132 and a position sensor 1134. The actuator 1132 may include a servo actuator, a servo motor, a stepper motor, or any suitable type of actuator. The position sensor 1134 may include a linear position sensor, an encoder, an emitter/detector, or any suitable type of position sensor. The position sensor 1134 may be linked to the first focusing lens 1110 mechanically, optically, or through any suitable linking means.

In this embodiment, the actuator 1132 is in operative communication with the system controller 1116 and the first focusing lens 1110 for adjusting a linear position of the first focusing lens 1110. The first focusing lens 1110 is adjustable from a first linear position closest to the polygon assembly under test 1118 to a second linear position farthest from the polygon assembly under test 1118. The position sensor 1134 is in operative communication with the system controller 1116 and the first focusing lens 1110 for sensing an actual linear position of first focusing lens 1110. In this embodiment, the system controller 1116 is for controlling the actuator 1132 to selectively adjust the linear position of the first focusing lens 1110 from a current linear position to a new linear position inclusively between the first and second linear positions based at least in part on the new linear position and a position signal from the position sensor 1134 representative of the actual linear position of the first focusing lens 1110. The new linear position having a distance relation to at least one other linear position of the first focusing lens 1110.

In the embodiment being described, the system controller 1116, in conjunction with the light sensor 1108, is for measuring the intensity of the second spot light over time during revolutions of the polygon assembly under test 1118 to obtain additional intensity measurements for each reflective facet 1120 for the new linear position of the first focusing lens 1110. In this embodiment, the system controller 1116 is for controlling the actuator 1132 to selectively adjust the linear position of the first focusing lens 1110 to a plurality of other linear positions and, in conjunction with the light sensor 1108, measure the intensity of the second spot light over time during revolutions of the polygon assembly under test 1118 to obtain additional intensity measurements for each reflective facet 1120 for the plurality of other linear positions.

In a further embodiment, in which the polygon assembly under test 1118 includes the index mark 1128 and the dynamic test setup 1100 include the emitter/detector device, the system controller 1116 generates a trigger to initiate each measuring of the intensity of the second spot light to obtain additional intensity measurements in conjunction with detection of the index mark 1128 after the first focusing lens 1110 has reached the corresponding new linear position.

In another further embodiment of the dynamic test setup 1100, when arranged in time relation, the intensity measurements correspond to a modulation pattern representative of the intensity of the second spot light over time. The modulation pattern including sections associated with each linear position of the first focusing lens 1110 at which intensity measurements are obtained. Each section including segments associated with each consecutive reflective facet 1120 for each revolution of the polygon assembly under test 1118 at the corresponding linear position. In this embodiment, the system controller 1116 is for determining a relative modulation value at each linear position of the first focusing lens 1110 at which intensity measurements are obtained for a select reflective facet 1120 by averaging peak values from each segment of the modulation pattern attributed to the select reflective facet 1120 and associated with the same section for each section of the modulation pattern. The system controller 1116 also for determining an estimated linear position of the first focusing lens 1110 that provides a peak focus of the first spot light on the target 1112 for the select reflective facet 1120 based at least in part on identifying a highest modulation value among the relative modulation values for the select reflective facet 1120. The system controller 1116 also for calculating a radius of curvature for the select reflective facet 1120 based at least in part on the estimated linear position of the first focusing lens 1110 that provides a peak focus of the first spot light on the target 1112 for the select reflective facet 1120.

In a yet further embodiment of the dynamic test setup 1100, the system controller 1116 is for arranging the relative modulation values for the select reflective facet 1120 in distance relation of the linear positions of the first focusing lens 1110 for the corresponding sections of the modulation pattern. The system controller 1116 also for applying a curve fitting algorithm to the arrangement of relative modulation values to provide a curve for the select reflective facet 1120 that fits the corresponding relative modulation values. The system controller 1116 also for determining the estimated linear position of the first focusing lens 1110 that provides the peak focus of the first spot light on the target 1112 for the select reflective facet 1120 based at least in part on the corresponding curve.

In another yet further embodiment of the dynamic test setup 1100, the system controller 1116 is for comparing the calculated radius of curvature for the select reflective facet 1120 to a minimum radius of curvature for individual reflective facets 1120 of the polygon assembly under test 1118. The system controller 1116 also for determining the polygon assembly under test 1118 is not suitable for use in the raster output scanning subsystem if the calculated radius of curvature is less than the minimum radius of curvature.

In yet another further embodiment of the dynamic test setup 1100, when arranged in time relation, the intensity measurements correspond to a modulation pattern representative of the intensity of the second spot light over time. The modulation pattern including sections associated with each linear position of the first focusing lens 1110 at which intensity measurements are obtained. Each section including segments associated with each consecutive reflective facet 1120 for each revolution of the polygon assembly under test 1118 at the corresponding linear position. In this embodiment, the system controller 1116 is for determining a relative modulation value at each linear position of the first focusing lens 1110 at which intensity measurements are obtained for each reflective facet 1120 by averaging peak values from each segment of the modulation pattern attributed to the same reflective facet 1120 and associated with the same section for each section of the modulation pattern. The system controller 1116 also for determining an estimated linear position of the first focusing lens 1110 that provides a peak focus of the first spot light on the target 1112 for each reflective facet 1120 based at least in part on identifying a highest relative modulation value among the relative modulation values for each corresponding reflective facet 1120. The system controller 1116 also for calculating a radius of curvature for each reflective facet 1120 based at least in part on the estimated linear position of the first focusing lens 1110 that provides a peak focus of the first spot light on the target 1112 for the corresponding reflective facet 1120.

In a yet further embodiment of the dynamic test setup 1100, the system controller 1116 is for determining an observed deviation of the calculated radiuses of curvature for the polygon assembly under test 1118 by determining a difference between a maximum value and a minimum value among the calculated radiuses of curvature. The system controller 1116 also for comparing the observed deviation to a maximum deviation for radiuses of curvature of reflective facets 1120 for the polygon assembly under test 1118. The system controller 1116 also for determining the polygon assembly under test 1118 is not suitable for use in the raster output scanning subsystem if the observed deviation exceeds the maximum deviation.

Figure 12:
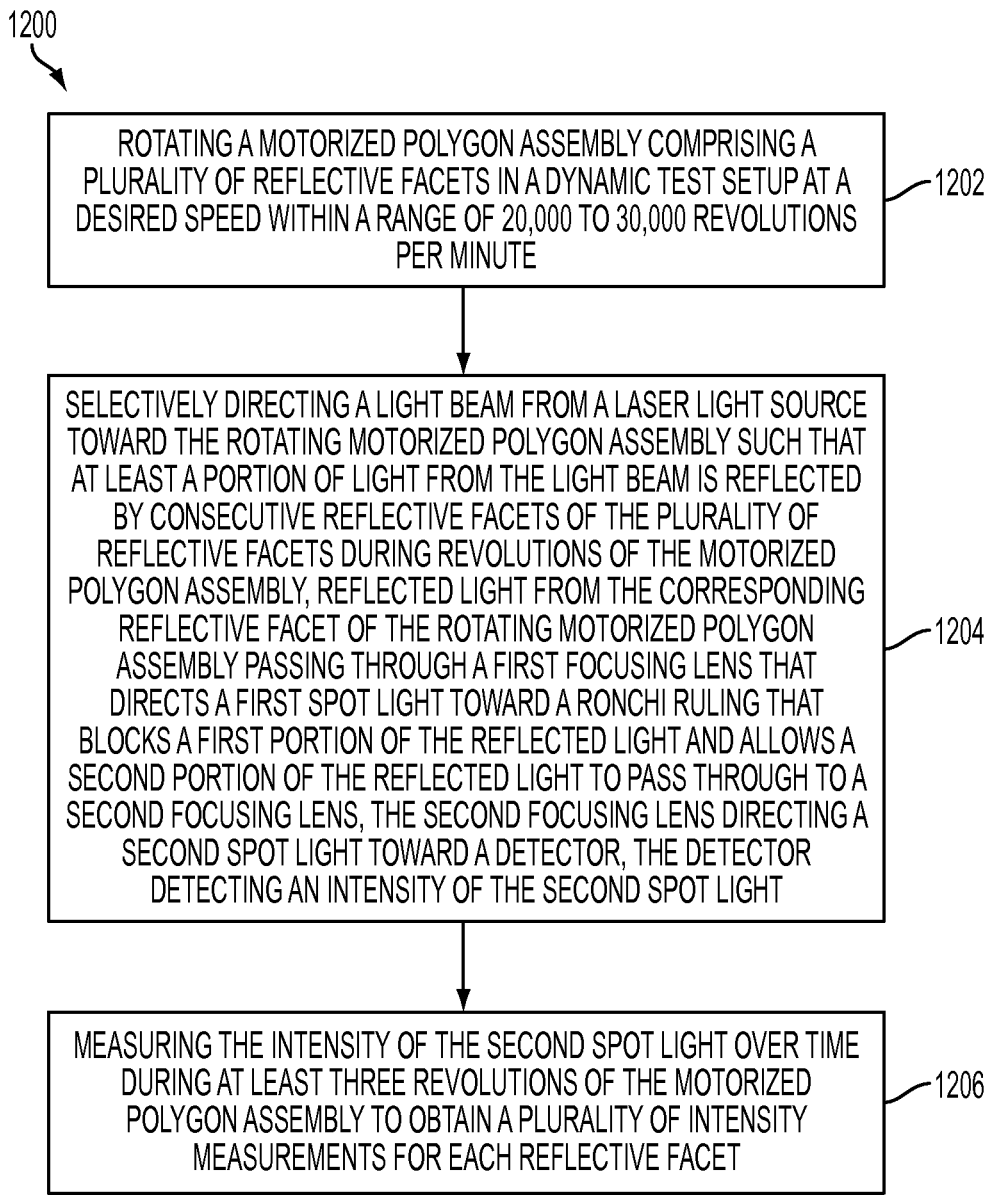
FIG. 12 is a flowchart of still yet another exemplary embodiment of a process for determining a flatness characteristic of a reflective facet of a polygon assembly.

With reference to FIG. 12, another exemplary embodiment of a process 1200 for determining a flatness characteristic for a reflective facet of a polygon assembly begins at 1202 where a motorized polygon assembly comprising a plurality of reflective facets is rotated in a dynamic test setup at a desired speed within a range of 20,000 to 30,000 revolutions per minute. Next, a light beam from a laser light source is selectively directed toward the rotating motorized polygon assembly such that at least a portion of light from the light beam is reflected by consecutive reflective facets of the plurality of reflective facets during revolutions of the motorized polygon assembly. Reflected light from the corresponding reflective facet of the rotating motorized polygon assembly passing through a first focusing lens that directs a first spot light toward a Ronchi ruling that blocks a first portion of the reflected light and allows a second portion of the reflected light to pass through to a second focusing lens. The second focusing lens directing a second spot light toward a detector. The detector detecting an intensity of the second spot light. At 1206, the intensity of the second spot light is measured over time during at least three revolutions of the motorized polygon assembly to obtain a plurality of intensity measurements for each reflective facet.

The desired speed may be set and detected by a motor controller associated with the polygon assembly. The motor controller may provide a signal, such as an MPA lock signal, after the polygon assembly reaches a steady state or stable condition at the desired speed to a system controller. The system controller may be able to set or program the desired speed in the motor controller. In other embodiments, any suitable means for setting and detecting the desired speed of the polygon assembly may be implemented.

In another embodiment of the process 1200, the motorized polygon assembly includes an index mark suitable for distinguishing revolutions of the motorized polygon assembly. In this embodiment, the process 1200 also includes detecting the index mark during revolutions of the motorized polygon assembly using an emitter/detector device. A trigger is generated each time the index mark is detected after the rotating motorized polygon assembly reaches the desired speed. The measuring in 1206 is initiated based at least in part on generation of the first trigger generated after the desired speed was reached. Each plurality of intensity measurements from 1206 is correlated to individual reflective facets of the motorized polygon assembly based at least in part on the triggers generated during each revolution of the motorized polygon assembly.

In yet another embodiment of the process 1200, a linear position of the first focusing lens is adjustable from a first linear position closest to the motorized polygon assembly to a second linear position farthest from the motorized polygon assembly. In this embodiment, the process 1200 also includes selectively adjusting the linear position of the first focusing lens from a current linear position to a new linear position inclusively between the first and second linear positions, the new linear position having a distance relation to at least one other linear position of the first focusing lens. The measuring in 1206 is repeated to obtain additional intensity measurements for each reflective facet for the new linear position of the first focusing lens. In this embodiment, the process 1200 repeats the selective adjusting of the linear position of the first focusing lens and the measuring to obtain additional intensity measurements for a plurality of other linear positions of the first focusing lens. The linear positions of the first focusing lens at which the intensity of the second spot light is measured include the first linear position, the second linear position, and other linear positions between the first and second linear positions at about 50 micrometer increments.

In the embodiment being described, when arranged in time relation, the intensity measurements correspond to a modulation pattern representative of the intensity of the second spot light over time. The modulation pattern including sections associated with each linear position of the first focusing lens at which intensity measurements are obtained. Each section including segments associated with each consecutive reflective facet for each revolution of the motorized polygon assembly at the corresponding linear position. In this embodiment, the process 1200 also includes determining a relative modulation value at each linear position of the first focusing lens at which intensity measurements are obtained for each reflective facet by averaging peak values from each segment of the modulation pattern attributed to the same reflective facet and associated with the same section for each section of the modulation pattern. An estimated linear position of the first focusing lens that provides a peak focus of the first spot light on the target is determined for each reflective facet based at least in part on identifying a highest relative modulation value among the relative modulation values for each corresponding reflective facet. A radius of curvature is calculated for each reflective facet based at least in part on the estimated linear position of the first focusing lens that provides a peak focus of the first spot light on the target for the corresponding reflective facet.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining a flatness characteristic for a reflective facet of a polygon assembly, comprising:
   a) rotating a polygon assembly comprising a plurality of reflective facets in a dynamic test setup at a speed the polygon assembly is expected to experience during operation of system equipment with a raster output scanning subsystem comprising the polygon assembly;
   b) selectively directing a light beam from a light source toward the rotating polygon assembly such that at least a portion of light from the light beam is reflected by consecutive reflective facets of the plurality of reflective facets during revolutions of the polygon assembly, reflected light from the corresponding reflective facet of the rotating polygon assembly passing through a first focusing lens that directs a first spot light toward a target having a plurality of spaced-apart bars arranged to form a grating pattern that blocks a first portion of the reflected light and allows a second portion of the reflected light to pass through to a second focusing lens, the second focusing lens directing a second spot light toward a light sensor, the light sensor detecting an intensity of the second spot light; and
   c) measuring the intensity of the second spot light over time during revolutions of the polygon assembly to obtain a plurality of intensity measurements for each reflective facet;
   wherein a linear position of the first focusing lens is adjustable from a first linear position closest to the polygon assembly to a second linear position farthest from the polygon assembly.

2. The method of claim 1 wherein the directing in b) and the measuring in c) are performed after the polygon assembly is rotating at a desired speed.

3. The method of claim 1 wherein the polygon assembly includes an index mark suitable for distinguishing revolutions of the polygon assembly, the method further comprising:
   d) detecting the index mark during revolutions of the polygon assembly using a device that includes an emitter and a detector pair; and
   e) correlating each plurality of intensity measurements from c) to individual reflective facets of the polygon assembly based at least in part on detection of the index mark.

4. The method of claim 3, further comprising:
   f) generating a trigger to initiate the measuring in c) in conjunction with detection of the index mark after the rotating polygon assembly has reached a desired speed.

5. The method of claim 3, further comprising:
   f) generating a trigger in conjunction with detection of the index mark during each revolution of the polygon assembly to facilitate the correlation of each plurality of intensity measurements from c) to individual reflective facets.

6. The method of claim 1, further comprising:
   d) selectively adjusting the linear position of the first focusing lens from a current linear position to a new linear position inclusively between the first and second linear positions, the new linear position having a distance relation to at least one other linear position of the first focusing lens;
   e) repeating c) to obtain additional intensity measurements for each reflective facet for the new linear position of the first focusing lens; and
   f) repeating d) and e) for a plurality of other linear positions of the first focusing lens.

7. The method of claim 6 wherein the polygon assembly includes an index mark suitable for distinguishing revolutions of the polygon assembly, the method further comprising:
   g) detecting the index mark during revolutions of the polygon assembly using a device that includes an emitter and a detector pair;
   h) generating a trigger to initiate each measuring in e) in conjunction with detection of the index mark after the first focusing lens has reached the corresponding new linear position.

8. The method of claim 6 wherein, when arranged in time relation, the intensity measurements correspond to a modulation pattern representative of the intensity of the second spot light over time, the modulation pattern including sections associated with each linear position of the first focusing lens at which intensity measurements are obtained, each section including segments associated with each consecutive reflective facet for each revolution of the polygon assembly at the corresponding linear position, the method further comprising:
   g) determining a relative modulation value at each linear position of the first focusing lens at which intensity measurements are obtained for a select reflective facet by averaging peak values from each segment of the modulation pattern attributed to the select reflective facet and associated with the same section for each section of the modulation pattern;

h) determining an estimated linear position of the first focusing lens that provides a peak focus of the first spot light on the target for the select reflective facet based at least in part on identifying a highest modulation value among the relative modulation values for the select reflective facet; and i) calculating a radius of curvature for the select reflective facet based at least in part on the estimated linear position of the first focusing lens that provides a peak focus of the first spot light on the target for the select reflective facet.

9. The method of claim 8, further comprising:

j) arranging the relative modulation values for the select reflective facet in distance relation of the linear positions of the first focusing lens for the corresponding sections of the modulation pattern;

k) applying a curve fitting algorithm to the arrangement of relative modulation values to provide a curve for the select reflective facet that fits the corresponding relative modulation values; and l) determining the estimated linear position of the first focusing lens that provides the peak focus of the first spot light on the target for the select reflective facet based at least in part on the corresponding curve.

10. The method of claim 8, further comprising:

j) comparing the calculated radius of curvature for the select reflective facet to a minimum radius of curvature for individual reflective facets of the polygon assembly; and k) determining the polygon assembly is not suitable for use in the raster output scanning subsystem if the calculated radius of curvature is less than the minimum radius of curvature.

11. The method of claim 6 wherein, when arranged in time relation, the intensity measurements correspond to a modulation pattern representative of the intensity of the second spot light over time, the modulation pattern including sections associated with each linear position of the first focusing lens at which intensity measurements are obtained, each section including segments associated with each consecutive reflective facet for each revolution of the polygon assembly at the corresponding linear position, the method further comprising:

g) determining a relative modulation value at each linear position of the first focusing lens at which intensity measurements are obtained for each reflective facet by averaging peak values from each segment of the modulation pattern attributed to the same reflective facet and associated with the same section for each section of the modulation pattern;

h) determining an estimated linear position of the first focusing lens that provides a peak focus of the first spot light on the target for each reflective facet based at least in part on identifying a highest relative modulation value among the relative modulation values for each corresponding reflective facet; and i) calculating a radius of curvature for each reflective facet based at least in part on the estimated linear position of the first focusing lens that provides a peak focus of the first spot light on the target for the corresponding reflective facet.

12. The method of claim 11, further comprising:

j) determining an observed deviation of the calculated radiuses of curvature for the polygon assembly by determining a difference between a maximum value and a minimum value among the calculated radiuses of curvature;

k) comparing the observed deviation to a maximum deviation for radiuses of curvature of reflective facets for the polygon assembly; and l) determining the polygon assembly is not suitable for use in the raster output scanning subsystem if the observed deviation exceeds the maximum deviation.

13. An apparatus for determining a flatness characteristic for a reflective facet of a polygon assembly, comprising:

a fixture for receiving a polygon assembly under test, the polygon assembly having a plurality of reflective facets, the fixture for retaining the polygon assembly under test so that a flatness characteristic of at least one reflective facet can be determined via a dynamic test setup;

a motor controller for controlling rotation of the polygon assembly under test;

a light source for selectively directing a light beam toward the polygon assembly under test;

a light sensor for detecting at least a portion of light reflected by the polygon assembly under test;

a first focusing lens disposed between the polygon assembly under test and the light sensor;

a target disposed between the first focusing lens and the light sensor;

a second focusing lens disposed between the target and the light sensor; and a system controller for controlling the motor controller to rotate the polygon assembly under test at a speed the polygon assembly is expected to experience during operation of system equipment with a raster output scanning subsystem comprising the polygon assembly, the system controller for controlling the light source to direct the light beam toward the rotating polygon assembly under test such that at least a portion of light from the light beam is reflected by consecutive reflective facets of the plurality of reflective facets during revolutions of the polygon assembly under test, reflected light from the corresponding reflective facet of the rotating polygon assembly under test passing through the first focusing lens, the first focusing lens directing a first spot light toward the target, the target having a plurality of spaced-apart bars arranged to form a grating pattern that blocks a first portion of the reflected light and allows a second portion of the reflected light to pass through to the second focusing lens, the second focusing lens for directing a second spot light toward the light sensor, the light sensor for detecting an intensity of the second spot light, and the system controller, in conjunction with the light sensor, for measuring the intensity of the second spot light over time during revolutions of the polygon assembly under test to obtain a plurality of intensity measurements for each reflective facet;

wherein the first focusing lens is adjustable from a first linear position closest to the polygon assembly under test to a second linear position farthest from the polygon assembly under test.

14. The apparatus of claim 13, further comprising:

a polarizing beam splitter disposed between the light source and the polygon assembly under test; and a quarter wave plate disposed between the polarizing beam splitter and the polygon assembly under test;

wherein the light beam from the light source is directed through the polarizing beam splitter toward the rotating polygon assembly under test such that S or P polarized light from the light beam is reflected by the consecutive reflective facets, reflected polarized light from the corresponding reflective facet of the rotating polygon assembly under test passing through the quarter wave plate and the polarizing beam splitter to the first focusing lens.

15. The apparatus of claim 13 wherein the spaced-apart bars in the target are substantially perpendicular to a direction of rotation of the polygon assembly under test such that the first spot light scans across the spaced-apart bars for each reflective facet during each revolution of the polygon assembly.

16. The apparatus of claim 13 wherein the polygon assembly under test includes an index mark suitable for distinguishing revolutions of the polygon assembly under test, the apparatus further comprising:
a device that includes an emitter and a detector pair in operative communication with the system controller for detecting the index mark during revolutions of the polygon assembly under test;
wherein the system controller correlates each plurality of intensity measurements to individual reflective facets of the polygon assembly under test based at least in part on detection of the index mark.

17. The apparatus of claim 13, further comprising:
an actuator in operative communication with the system controller and the first focusing lens for adjusting a linear position of the first focusing lens; and
a position sensor in operative communication with the system controller and the first focusing lens for sensing an actual linear position of first focusing lens;
wherein the system controller is for controlling the actuator to selectively adjust the linear position of the first focusing lens from a current linear position to a new linear position inclusively between the first and second linear positions based at least in part on the new linear position and a position signal from the position sensor representative of the actual linear position of the first focusing lens, the new linear position having a distance relation to at least one other linear position of the first focusing lens;
wherein the system controller, in conjunction with the light sensor, is for measuring the intensity of the second spot light over time during revolutions of the polygon assembly under test to obtain additional intensity measurements for each reflective facet for the new linear position of the first focusing lens;
wherein the system controller is for controlling the actuator to selectively adjust the linear position of the first focusing lens to a plurality of other linear positions and, in conjunction with the light sensor, measure the intensity of the second spot light over time during revolutions of the polygon assembly under test to obtain additional intensity measurements for each reflective facet for the plurality of other linear positions.

18. A method for determining a flatness characteristic for a reflective facet of a polygon assembly, comprising:
a) rotating a motorized polygon assembly comprising a plurality of reflective facets in a dynamic test setup at a desired speed within a range of 20,000 to 30,000 revolutions per minute;
b) selectively directing a light beam from a laser light source toward the rotating motorized polygon assembly such that at least a portion of light from the light beam is reflected by consecutive reflective facets of the plurality of reflective facets during revolutions of the motorized polygon assembly, reflected light from the corresponding reflective facet of the rotating motorized polygon assembly passing through a first focusing lens that directs a first spot light toward a Ronchi ruling that blocks a first portion of the reflected light and allows a second portion of the reflected light to pass through to a second focusing lens, the second focusing lens directing a second spot light toward a detector, the detector detecting an intensity of the second spot light; and
c) measuring the intensity of the second spot light over time during at least three revolutions of the motorized polygon assembly to obtain a plurality of intensity measurements for each reflective facet;
wherein a linear position of the first focusing lens is adjustable from a first linear position closest to the motorized polygon assembly to a second linear position farthest from the motorized polygon assembly.

19. The method of claim 18 wherein the motorized polygon assembly includes an index mark suitable for distinguishing revolutions of the motorized polygon assembly, the method further comprising:
d) detecting the index mark during revolutions of the motorized polygon assembly using a device that includes an emitter and a detector pair;
e) generating a trigger each time the index mark is detected after the rotating motorized polygon assembly reaches the desired speed;
f) initiating the measuring in c) based at least in part on a first trigger generated in e); and
g) correlating each plurality of intensity measurements from c) to individual reflective facets of the motorized polygon assembly based at least in part on the triggers generated in e).

20. The method of claim 18, further comprising:
d) selectively adjusting the linear position of the first focusing lens from a current linear position to a new linear position inclusively between the first and second linear positions, the new linear position having a distance relation to at least one other linear position of the first focusing lens;
e) repeating c) to obtain additional intensity measurements for each reflective facet for the new linear position of the first focusing lens;
f) repeating d) and e) for a plurality of other linear positions of the first focusing lens, wherein the linear positions of the first focusing lens at which the intensity of the second spot light is measured include the first linear position, the second linear position, and other linear positions between the first and second linear positions at about 50 micrometer increments, wherein, when arranged in time relation, the intensity measurements correspond to a modulation pattern representative of the intensity of the second spot light over time, the modulation pattern including sections associated with each linear position of the first focusing lens at which intensity measurements are obtained, each section including segments associated with each consecutive reflective facet for each revolution of the motorized polygon assembly at the corresponding linear position;
g) determining a relative modulation value at each linear position of the first focusing lens at which intensity measurements are obtained for each reflective facet by averaging peak values from each segment of the modulation pattern attributed to the same reflective facet and associated with the same section for each section of the modulation pattern;
h) determining an estimated linear position of the first focusing lens that provides a peak focus of the first spot light on the target for each reflective facet based at least in part on identifying a highest relative modulation value among the relative modulation values for each corresponding reflective facet; and i) calculating a radius of curvature for each reflective facet based at least in part on the estimated linear position of the first focusing lens that provides a peak focus of the first spot light on the target for the corresponding reflective facet.

* * * * *